United States Patent [19]

Gault

[11] 4,225,551

[45] Sep. 30, 1980

[54] BOAT HULLS

[76] Inventor: Robert Gault, 12 Ranmoor Cliffe Rd., Sheffield S10 3HB, England

[21] Appl. No.: 907,199

[22] Filed: May 18, 1978

[51] Int. Cl.² .............................................. B29C 24/00
[52] U.S. Cl. ........................................ 264/238; 9/2 F; 264/295; 264/322
[58] Field of Search ............... 264/295, 322, 339, 238; 9/2 C, 2 F, 6 P, 2 R

[56] References Cited

U.S. PATENT DOCUMENTS

| | | | |
|---|---|---|---|
| 3,454,694 | 7/1969 | Delaire | 264/295 X |
| 3,771,180 | 11/1973 | Tanabe | 9/2 F |
| 3,900,550 | 8/1975 | Oliver | 264/295 X |
| 4,002,417 | 1/1977 | Vecchiotti | 264/339 X |

FOREIGN PATENT DOCUMENTS 2105554  4/1972  France ..................................... 264/295

*Primary Examiner*—Thomas P. Pavelko
*Attorney, Agent, or Firm*—Birch, Stewart, Kolasch & Birch

[57] ABSTRACT

The present invention relates to the fabrication of boat hulls and other three-dimensional objects of thermoplastic sheet material. The process comprises heating a sheet of the material along a predetermined pattern of lines to a temperature at which the material is softened, placing the sheet in a jig with the material of the sheet still soft along the heated lines and folding it along the softened lines, and retaining the sheet in its folded state in the jig until the material along the said lines is cool and stiffens. The preferred thermoplastic material is polypropylene, and by reversely folding the sheet along selected fold lines an integral hinge can be induced. In making a foldable boat, the pattern of fold lines is such that the sheet in its folded state has the shape of the hull of a boat. A blank when so prepared can be rolled into extremely compact form for transportation and to erect the hull is merely unrolled and with a little manual assistance put into the required shape and secured. Gunwales, one or more stiffening members and one or more seats can readily be affixed.

9 Claims, 8 Drawing Figures

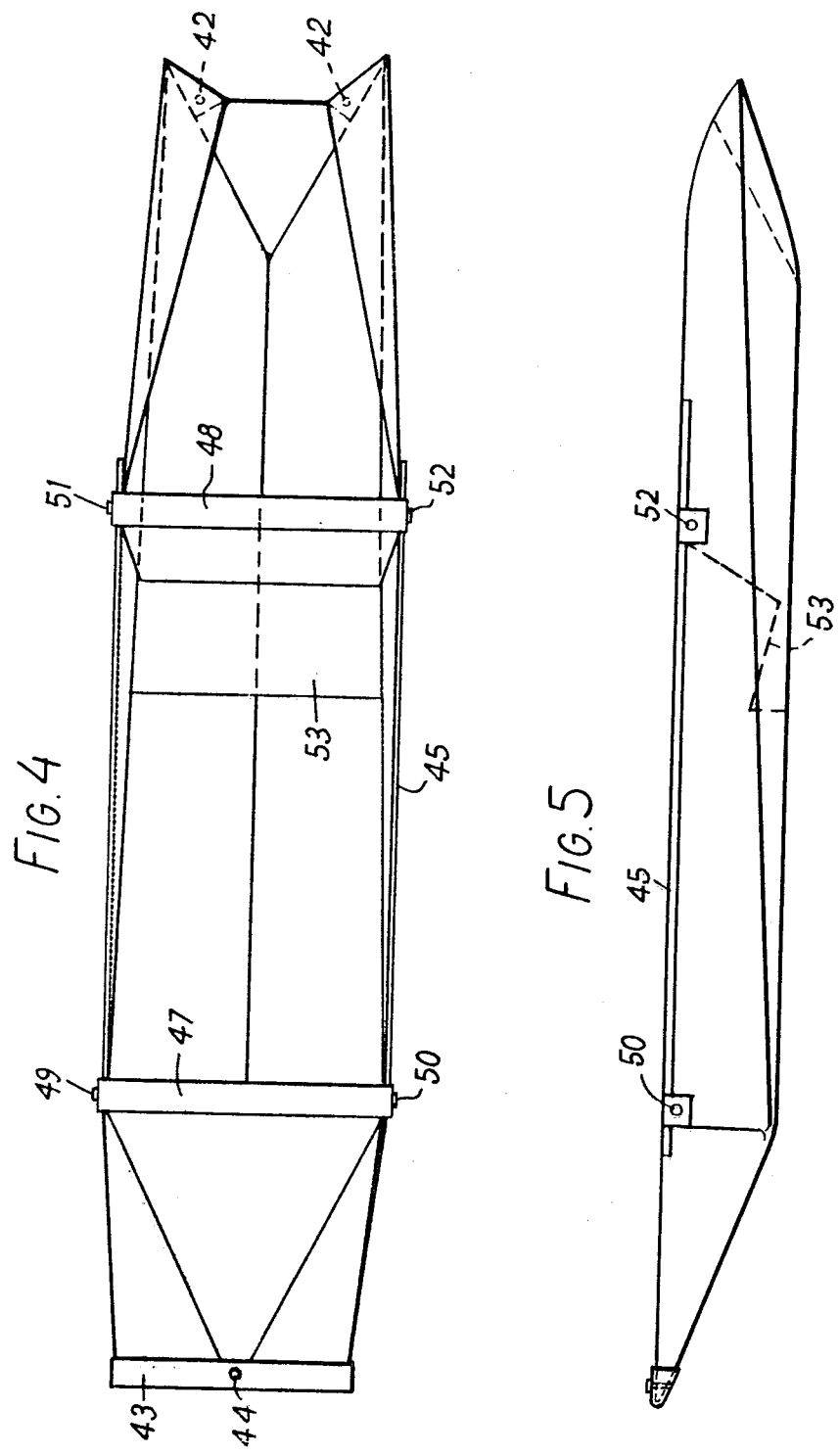

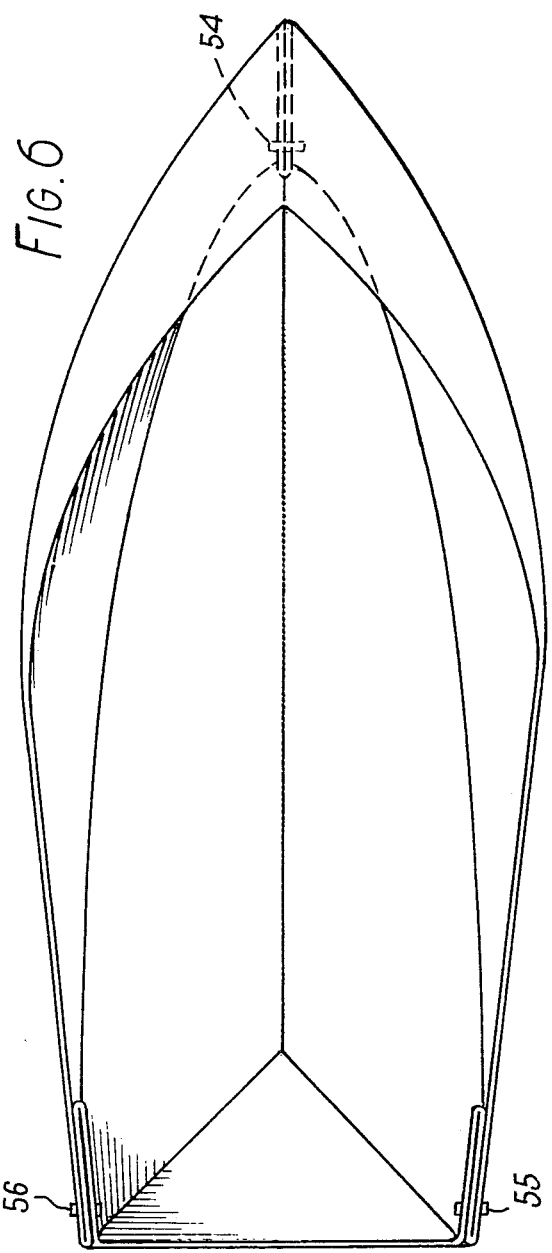
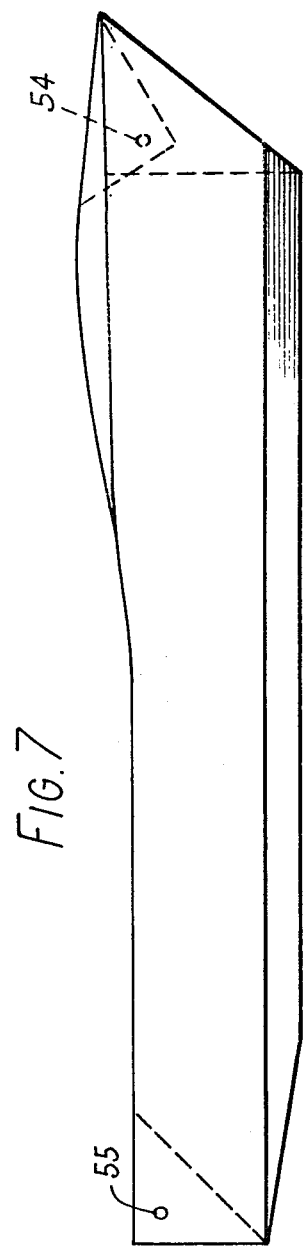

BOAT HULLS

BACKGROUND OF THE INVENTION

The present invention relates to three-dimensional objects of thermoplastic sheet material and their fabrication and is concerned particularly, but not exclusively, with boat hulls of thermoplastic sheet material and their fabrication.

SUMMARY OF THE INVENTION

One object of the present invention is to provide an improved method of fabricating the hull of a boat of seamless construction from a single sheet of thermoplastic material of rectangular or substantially rectangular shape.

According to the present invention in one aspect there is provided a method of fabricating a three dimensional object of sheet material comprising the steps of providing a sheet of thermoplastics material of predetermined shape, heating the sheet along a predetermined pattern of lines to a temperature at which the material is softened along the said lines, providing a jig upon which to fold the sheet along the said lines, placing the sheet in the jig with the material of the sheet still soft along the said lines, folding the sheet in the jig along the softened lines, and retaining the sheet in its folded state in the jig until the material along the said lines is cool and stiffens. Preferably the thermoplastic material is a polyolefin and especially polypropylene. By suitable choice of material such as polypropylene an included step of reversely folding the sheet along the fold lines causes an integral hinge to be induced.

According to the invention in another aspect there is provided a method of preparing a blank from which the hull of a foldable boat can be fabricated, including the steps of providing a substantially rectangular sheet of thermoplastic material of a thickness not less than one millimeter and not more than four millimeters, heating the sheet along a predetermined pattern of lines to a temperature at which the material is softened along the said lines, providing a jig upon which to fold the sheet along the said lines, placing the sheet in the jig with the material of the sheet still soft along the said lines, folding the sheet in the jig along the softened lines, and retaining the sheet in the jig in its folded state until the material along the said lines is cool and stiffens, the pattern of lines being such that the sheet in its folded state has the shape of the hull of a boat. A blank when so prepared can be rolled into extremely compact form for transportation. To erect the hull for use the sheet is unrolled and can then readily be erected into a hull. The sheet tends to assume the shape of the hull from the memory built into the thermoplastics material along the fold lines and with a little manual assistance is readily put into the required shape in which the folds can be secured by any suitable securing means. Other members such as a gunwale, one or more stiffening members and one or more seats can then readily be affixed.

BRIEF DESCRIPTION OF THE DRAWINGS

The invention will now be described by way of example, with reference to the accompanying drawings, in which:

FIGS. 4 and 5 show the sheet when folded in the jig in FIG. 3 used to provide the hull of a boat;

FIGS. 6 and 7 show a hull of a different shape fabricated by the method as described with reference to FIGS. 1 to 5 from a starting blank as shown with a pattern of appropriate lines in FIG. 8.

DETAILED DESCRIPTION OF THE INVENTION

Figure 1:
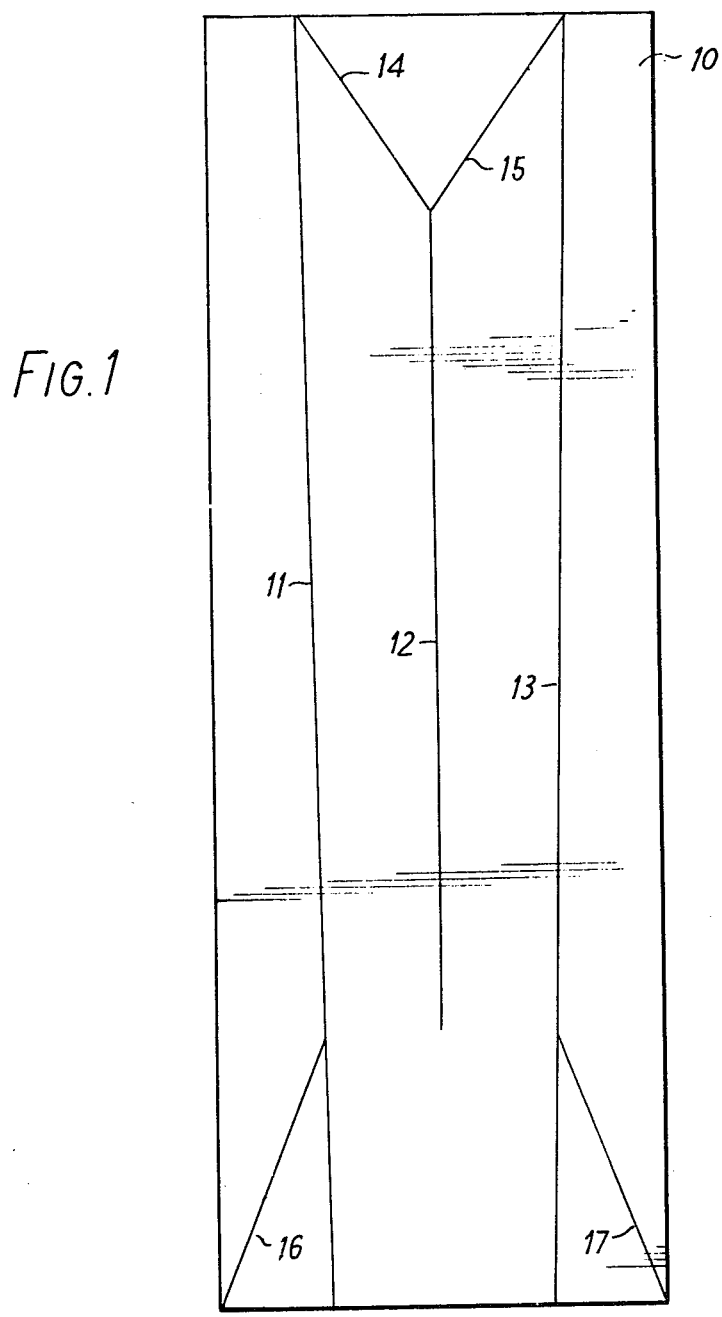
FIG. 1 is a plan view of a rectangular sheet of polypropylene upon which a pattern of lines is shown along which folding is required.

Referring to FIG. 1 a blank is illustrated in the form of a sheet 10 of polypropylene which has a thickness of two millimeters. The sheet 10 in the drawing shows a pattern of lines 11 to 17 about which the sheet 10 is required to be folded and unfolded when using the sheet to fabricate and dismantle the hull of a foldable boat. Thus it is required to form folds or hinges along the lines 11 to 17 about which repeated folding and unfolding can be effected.

Figure 2:
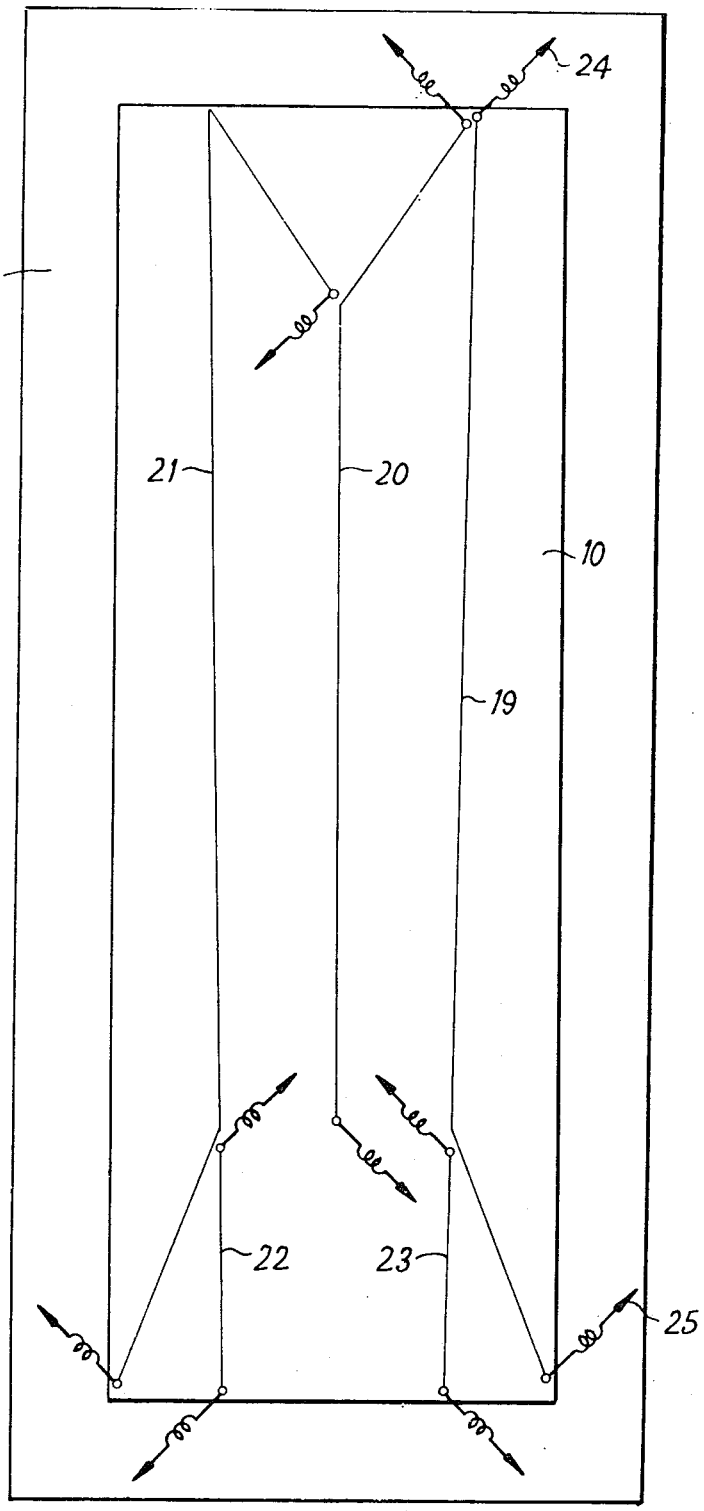
FIG. 2 shows the sheet of FIG. 1 provided with means to effect heating along the lines in the pattern of FIG. 1.

The sheet 10 is placed upon a bed 18 shown in FIG. 2 and linear heating elements 19 to 23 of tape or tubular form are located on the sheet 10 in the pattern of lines required on the sheet as will be seen from a comparison of FIGS. 1 and 2. The linear heating elements are connected to appropriate sources of heating as indicated for example by the arrows 24 and 25 from the element 19. The heating tapes or tubes 19 to 23 can be of any suitable form, such as electric or hot fluid.

Heat is maintained in the heating elements until the polypropylene along the pattern of lines 11 to 17 is softened.

Figure 3:
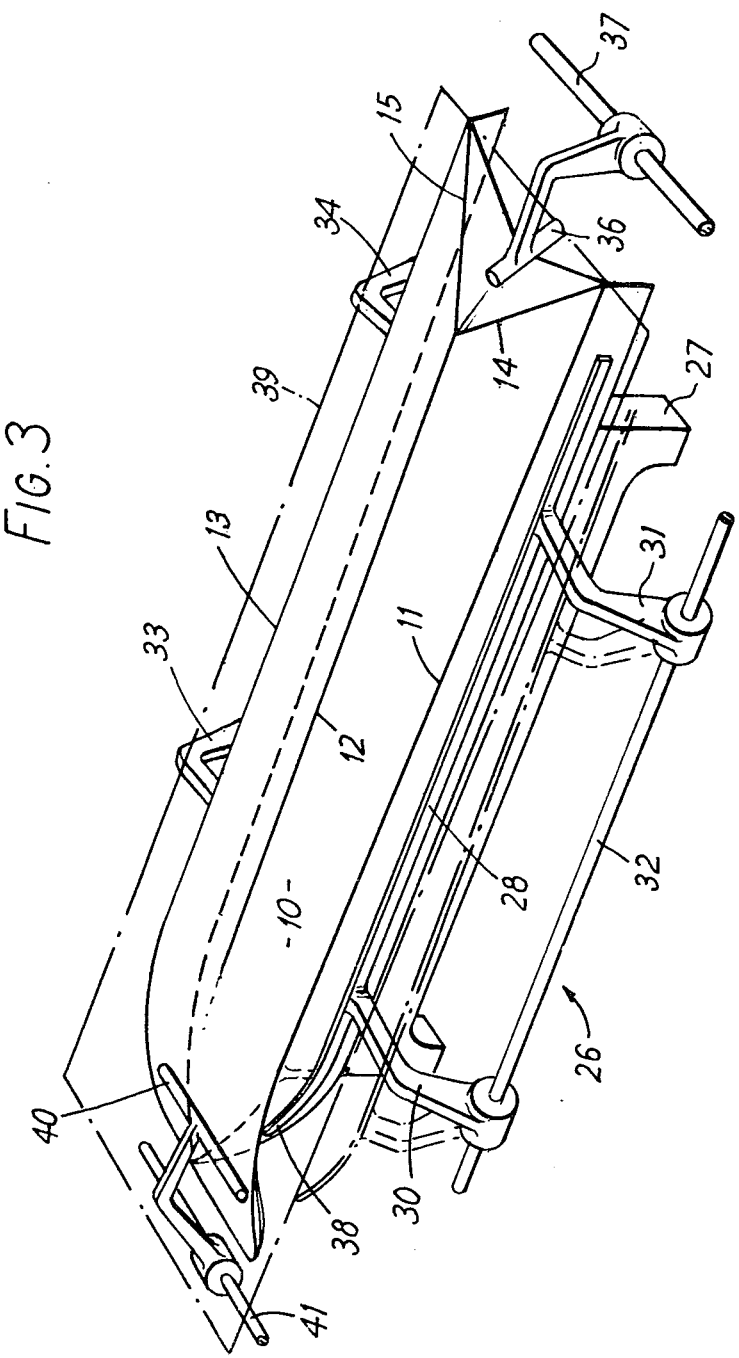
FIG. 3 shows a jig upon which the sheet when heated along the lines indicated in FIG. 2 can be folded.

Referring now to FIG. 3 this shows a jig 26 on which the sheet 10 can be folded along the pattern of softened lines. The jig comprises a bed 27 of which the upper surface has the shape of an inverted shallow V. Along opposite sides of the bed 27 there are mounted two longitudinal folding members 28, one of which is visible in the drawing. The folding members 28 are respectively supported on arms 30, 31 and 33, 34 pivotally mounted on common pivots 32.

At the right-hand end of the jig, as illustrated in FIG. 3, a stern folding member is provided in the form of a single arm 36 mounted for pivotal movement on a pivot 37.

At the left-hand end of the jig the end of the longitudinal members 28 are curved inwardly to provide bow folding members 38. These cooperate with a pressure member 40 to form a surf board-like bow. The member 40 is pivotally mounted on a pivot 41.

The sheet 10 with the pattern of fold lines softened by the heating elements shown in FIG. 2 is removed from the bed 18 and located in the jig 26 of FIG. 3. At this stage the folding members are in their "open" or withdrawn positions, as shown for the nearest member 28 in broken lines in FIG. 3, the outline of the sheet at this stage being indicated by the broken line 39.

Initially the sheet will tend to fold automatically about the center line 12 under gravity and this may be sufficient but can be manually assisted if required to conform to the inverted V-shape of the top surface of the bed 27.

When this step is completed the longitudinal folding members 28 are pivoted into contact with the outer longitudinal regions of the sheet 10 and fold these regions downwardly about the longitudinal edges of the bed 27 which are in register with the softened lines 11 and 13. The members 28 are then in their closed positions as shown in full lines in FIG. 3.

With the sheet 10 held in this position by the members 28 the stern folding member 36 is pivoted to the position shown in FIG. 3 to effect folding of the sheet along the softened lines 14 and 15.

Finally the bow pressure member 40 is swung into its closed position to produce the flare folds as indicated.

With all the folds in place the sheet is held in the jig until the material along the fold lines cools and stiffens.

It is then removed from the jig and is ready for use. It will be appreciated that the material now has a fold "memory" and tends thereafter to assume its folded shape in the form of a hull. If desired the material can be flexed along selected fold lines before its removal from the jig. This brings about molecular re-orientation and induces what is known in the plastics art as an integral hinge.

Although the sheet tends to assume its folded shape it can readily be rolled into a compact package for transportation. When it is unrolled it again tends to assume its folded shape from the "memory" built into the fold lines.

Referring now to FIGS. 4 and 5 illustrating plan and elevation views, respectively, of the sheet 10 as finally used as the hull of a boat.

The sheet is folded along the fold lines and at the bow two securing devices 42 such as a bolt and nut of nylon are used to secure the folds as shown at the stern. At the bow a single transverse stiffening member 43 and a clamping bolt and nut 44 is employed to secure the stern fold. A gunwale 45 in the form of a plastic extrusion of C cross-section can also be added for stiffening. To stiffen the boat athwartships two crossbraces 47 and 48 can be fitted as shown with clamping bolts 49 and 50 and 51, 52. A seat 53 is also shown fitted. This can be integrated with the stiffening member 48.

From the moment of opening a package containing the prepared blank in a rolled-up form, together with the various fittings shown in FIGS. 4 and 5, the boat can be made ready for use within a few minutes.

Figure 8:
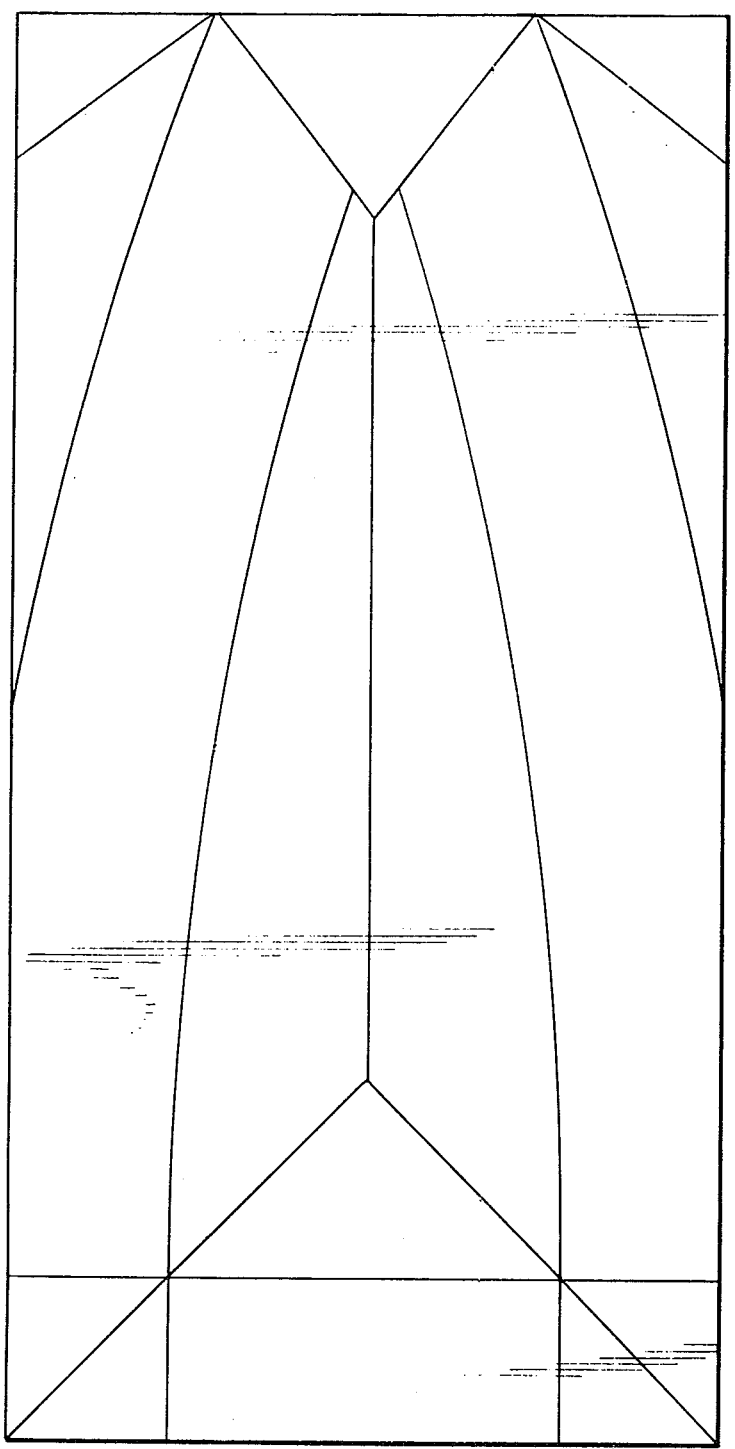
FIG. 8 is a plan view of a rectangular sheet upon which a second pattern of lines is shown along which folding is required.

It will be appreciated that a wide variety of different hull shapes can be fabricated by means of the invention by preparing a blank and folding along preformed fold lines in a manner analogous to that already described. For example a hull as shown in the plan view of FIG. 6 and the elevation view of FIG. 7 can be produced by heating a rectangular sheet of thermoplastics material along a pattern of lines as shown in FIG. 8 until the material is soft along the lines shown. The blank of FIG. 8 is then placed in a jig to suit the pattern of FIG. 8 and is folded along the softened fold lines and held until the material cools and stiffens along the fold lines. The folds of the hull of FIGS. 6 and 7 can be secured by only three securing devices such as nylon bolts and nuts as shown at 54, 55 and 56.

Although the invention has been described with reference to the fabrication of hulls for boats it will be understood that other three-dimensional objects of sheet material can also be fabricated by means of the invention. It will also be appreciated that although the invention is particularly suitable for use in the fabrication of three-dimensional objects of various shapes from a rectangular or substantially rectangular sheet of thermoplastic material, the sheet need not be of such shape and will depend upon the shape of the object to be fabricated.

I claim:

1. A method of preparing a blank from which the hull of a collapsible boat can be fabricated, including the steps of providing a substantial planar, solid rectangular sheet of thermoplastic polyolefin material of a thickness not less than one millimeter and not more than four millimeters, heating the sheet on one face thereof along a predetermined pattern of lines to a temperature at which the material is softened along the said lines, providing a jig upon which to fold the sheet along the said lines, placing the sheet in the jig with the material of the sheet still soft along the said lines, folding the sheet in the jig along the softened lines in the direction of the heated face, and retaining the sheet in the jig in its folded state until the material along the said lines is cool and stiffens to form a fold tending when flattened to resume its folded position, the pattern of lines being such that the sheet in its folded state has the shape of the hull of a boat, and whereby said folded sheet is capable of being flattened for expediting storage and movement when not in use.

2. A method according to claim 1, and including the step of folding the sheet along selected ones of the said lines in the direction opposite to the heated face to induce molecular orientation and integral hinges along said selected lines.

3. A method of fabricating the hull of a foldable boat including the steps of preparing a blank by the method according to claim 6, refolding the prepared blank along the fold lines to reconstitute the hull shape and securing the folds of sheet to maintain the hull shape.

4. A method according to claim 3 and including the subsequent steps of adding stiffening means to the folded hull-shaped sheet.

5. A method of fabricating a foldable blank for a three dimensional object of sheet material comprising the steps of: providing a self-supporting flexible, planar, solid sheet made of a thermoplastic polyolefin material of predetermined shape; heating the sheet on one face thereof along a predetermined pattern of lines to a temperature at which said thermoplastic polyolefin material is softened along said lines; folding the sheet along the softened lines in the direction of the heated face with the thermoplastic polyolefin material of the sheet still soft along said lines; retaining the sheet in its folded state until the thermoplastic polyolefin material along said lines is cool and stiffens; and folding the sheet in the opposite direction to the heated face along selected ones of said lines to induce molecular reorientation in the region of such fold and provide integral hinges along such selected lines, thereby obtaining a blank for said object in which said selected lines are hinged and the unselected remainder of said lines have folds that when flattened tend to return to their folded condition, and whereby said folded sheet is capable of being flattened for expediting storage and movement when not in use.

6. A method of fabricating a blank for the hull of a boat, comprising the steps of: providing a self-supporting flexible, planar, solid sheet made of a thermoplastic material capable of forming re-openable folds and integral hinges; heating the sheet on one face thereof along a predetermined pattern of lines to a temperature at which said thermoplastic material is softened along said lines, said lines defining fold lines required to form said blank into said hull; folding the sheet along said lines in the direction of the heated face; retaining said sheet in its folded state until the thermoplastic material along said lines is cool and stiffens; and folding said sheet in the opposite direction to the heated face along selected ones of said lines to induce molecular reorientation in the region of such fold and provide integral hinges along said selected lines and thereby forming a blank which can be folded up and when unfolded facilitates erection of the hull by reason of a tendency of the folds of the unselected remainder of said lines to revert to their folded state, and whereby said folded sheet is capable of being flattened for expediting storage and movement when not is use.

7. A method according to claim 6 wherein said material is polypropylene.

8. A method of fabricating a foldable blank for the hull of a boat according to claim 6, wherein, said fold lines include curved lines.

9. A method according to claim 6, wherein said sheet material retains flexibility in finishing blank which is thereby rollable.

* * * * *